United States Patent
Benjamin et al.

(10) Patent No.: US 9,146,912 B1
(45) Date of Patent: Sep. 29, 2015

(54) SYSTEMS AND METHODS FOR AUTOMATED TAXONOMY CONCEPT REPLACEMENT IN AN XBRL DOCUMENT

(71) Applicant: WORKIVA INC., Ames, IA (US)

(72) Inventors: Bradley Benjamin, Bozeman, MT (US); Susan Yount, Ames, IA (US); David Andrew Haila, Clive, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/473,391

(22) Filed: Aug. 29, 2014

Related U.S. Application Data

(63) Continuation-in-part of application No. 13/834,846, filed on Mar. 15, 2013, now Pat. No. 8,825,614.

(60) Provisional application No. 61/639,457, filed on Apr. 27, 2012.

(51) Int. Cl.
*G06F 17/30* (2006.01)
*G06F 17/22* (2006.01)
*G06F 17/21* (2006.01)

(52) U.S. Cl.
CPC .......... *G06F 17/2264* (2013.01); *G06F 17/211* (2013.01)

(58) Field of Classification Search
None
See application file for complete search history.

(56) References Cited

U.S. PATENT DOCUMENTS

| | | | |
|---|---|---|---|
| 7,415,482 B2 | 8/2008 | Blake et al. | |
| 7,472,346 B2 | 12/2008 | Baelen | |
| 7,822,769 B2 | 10/2010 | Rohan et al. | |
| 8,099,370 B2 | 1/2012 | Ohata | |
| 8,176,003 B2 | 5/2012 | Bush et al. | |
| 2005/0144166 A1 | 6/2005 | Chapus et al. | |
| 2006/0184539 A1 | 8/2006 | Blake et al. | |
| 2006/0242181 A1 | 10/2006 | Mueller-Klingspor | |
| 2006/0242624 A1 | 10/2006 | Mueller-Klingspor | |
| 2007/0078877 A1 | 4/2007 | Ungar et al. | |
| 2008/0201157 A1 | 8/2008 | McNamar | |
| 2008/0201172 A1 | 8/2008 | McNamar | |
| 2008/0201319 A1 | 8/2008 | McNamar | |
| 2008/0270312 A1* | 10/2008 | Ohata | 705/76 |

(Continued)

OTHER PUBLICATIONS

Financial Accounting Standards Board, 2011 FASB US GAAP Financial Reporting Taxonomy Release Notes, Jan. 31, 2011, 291 pages, copyright XBRL US, Inc. 2007-2010; Financial Accounting Foundation, Inc. 2010-2011.

(Continued)

*Primary Examiner* — Hung Q Pham
(74) *Attorney, Agent, or Firm* — Drinker Biddle & Reath LLP

(57) ABSTRACT

An XBRL extension taxonomy concept replacement system includes: a computer processor having a memory on which a program executable by the processor is stored for performing a method of XBRL extension taxonomy concept replacement; an XBRL taxonomy module including an XBRL extension taxonomy having XBRL extension taxonomy concepts and an XBRL base taxonomy having related XBRL base taxonomy concepts; and an automated superfluous XBRL extension taxonomy concept detection module that analyzes an XBRL document having XBRL tags and identifies an XBRL extension taxonomy concept of an XBRL extension taxonomy that is superfluous in comparison with an XBRL base taxonomy concept of an XBRL base taxonomy upon which the XBRL extension taxonomy is based.

28 Claims, 11 Drawing Sheets

(56) References Cited

U.S. PATENT DOCUMENTS

| | | |
|---|---|---|
| 2009/0019358 A1 | 1/2009 | Blake et al. |
| 2009/0030754 A1 | 1/2009 | McNamar |
| 2010/0122154 A1 | 5/2010 | Howell et al. |
| 2011/0137923 A1 | 6/2011 | Koroteyev et al. |
| 2011/0258167 A1 | 10/2011 | Binstock et al. |
| 2011/0276873 A1 | 11/2011 | Gorur et al. |
| 2012/0011118 A1 | 1/2012 | Gleicher et al. |

OTHER PUBLICATIONS

Hoffman et al., Extensible Business Reporting Language (XBRL) 2.1, Recommendation—Dec. 31, 2003 + Corrected Errata—Apr. 25, 2005, pp. 1-158, editors Engel et al., copyright 2000-2004, 2005 XBRL International.

* cited by examiner

XBRL Concept Search

New Concept Search  □ ✕

Search Taxonomy

| Type | Concept ▽ | Period Type | -ALL- ▽ | Data Type | -ALL- ▽ | □ My Extensions |
|---|---|---|---|---|---|---|

☑ New Concepts  □ Incl Deprecated  □ Taxonomy Tree Filter 🌲  □ Branch Filter on 🌲

[Search] — 405

◉ Search  ○ Outline Tree  ○ Taxonomy Tree  [EDIT]  20 results found  Create New Concept 🔍⊕

— 410

Accounts payable, Current ☆ — 420

◉ Monetary [NEW] — 415   ○○○ 72%

Carrying value as of the balance sheet date of liabilities incurred (and for which invoices have typically been received) and payable to vendors for goods and services received that are used in an entity's business. Used to reflect the current portion of the liabilities (due within one year or...

Accrued Liabilities, Current ☆

◉ Monetary [NEW] — 415   ○○○ 46%

Carrying value as of the balance sheet date of obligations incurred and payable, pertaining to costs that are statutory in nature, are incurred on contractual obligations, or accumulate over time and for which invoices have not yet been received or will not be rendered. Examples include ...

Stockholders' Equity Including Portion Attributable to Noncontrolling Interest ☆

◉ Monetary [NEW] — 415   ○○○ 34%

Total of Stockholders' Equity (deficit) items, net of receivables from officers, directors owners, and affiliates of the entity including portions attributable to both the parent and noncontrolling interests (previously referred to as minority interest), if any. The entity including portions ...

Employee-related Liabilities, Current ☆

FIG. 4

Deprecated Concept Search □ x

XBRL Concept Search  [Cash ⊗]  [Search] ☑ Advanced

Type [Concept ▼]  Period Type [-ALL- ▼]  Data Type [-ALL- ▼]  ☐ My Extensions

☐ New Concepts  ☑ Incl Deprecated  ☐ Taxonomy Tree Filter  ☐ Branch Filter on

⦿ Search  ○ Outline Tree  ○ Taxonomy Tree [EDIT]  20 results found   Create New Concept Includes currency on hand as well as demand deposits with banks or financial institutions. It also includes other kinds of accounts that have the general characteristics of demand deposits in that the Entity may deposit additional funds at any time and also effectively may withdraw funds...

Cash and Cash Equivalents, Period Increase (Decrease)
▣ Monetary    ○○○ 89%
The net change between the beginning and ending balance of cash and cash equivalents.

Cash Dividends (Deprecated 2009-01-31)
▣ Monetary (DEPRECATED)    ○○○ 1%
Cash dividend declared by an entity to shareholders during the period. This element includes paid and unpaid dividends declared during the period.

Cash and Due from Banks
⦿ Monetary    ○○○ 1%
For banks and other depository institutions: Includes cash on hand (currency and coin), cash items in process of collection, noninterest bearing deposits due from other financial institutions (including corporate credit unions), and balances with the Federal Reserve Banks, Federal Home ...

FIG. 5

SYSTEMS AND METHODS FOR AUTOMATED TAXONOMY CONCEPT REPLACEMENT IN AN XBRL DOCUMENT

CROSS-REFERENCE TO RELATED APPLICATIONS

This application is a continuation-in-part of U.S. patent application Ser. No. 13/834,846 entitled "Systems and Methods for Automated Taxonomy Migration in an XBRL Document" and filed on Mar. 15, 2013, which claims the priority benefit of U.S. Provisional Patent Application No. 61/639,457 entitled "Systems and Methods for Automated Taxonomy Migration in an XBRL Document" and filed on Apr. 27, 2012, both of which are hereby incorporated herein by reference in their entirety.

BACKGROUND

1. Field

Embodiments generally relate to reporting of business data in documents using the eXtensible Business Reporting Language (XBRL), and more particularly to systems and methods for automated taxonomy migration in an XBRL document.

2. Related Art

XBRL is a standardized computer language by which businesses may efficiently and accurately communicate business data with each other and with regulating agencies. [See Extensible Business Reporting Language (XBRL) 2.1, available at http://www.xbrl.org/Specification/XBRL-RECOMMENDATION-2003-12-31+Corrected-Errata-2005-04-25.rtf, and Recommendation 2003-12-31+Corrected Errata–2005-04-25 available at http://www.xbrl.org/Specification/XBRL-RECOMMENDATION-2003-12-31+Corrected-Errata-2005-04-25.htm.] It is a markup language not too dissimilar from XML (eXtensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

A taxonomy is comprised of an XML Schema and all of the linkbases contained in that schema or directly referenced by that schema. The XML schema is known as a taxonomy schema. In XBRL terminology, a concept is a definition of a reporting term. Concepts manifest as XML Schema element definitions. In the taxonomy schema, a concept is given a concrete name and a type. The type defines the kind of data types allowed for facts measured according to the concept definition. For example, a "cash" concept would typically have a monetary type. This declares that when cash is reported, its value will be monetary. In contrast, an "accountingPoliciesNote" concept would typically have a string type so that, when the "accountingPoliciesNote" is reported in an XBRL instance, its value would be interpreted as a string of characters.

XBRL is bringing about a dramatic change in the way people think about exchanging business information. Financial disclosures are a prime example of an industry built around a paper based process that is being pushed into the technological age. This transition involves a paradigm shift from the pixel perfect world of building unstructured reports to a digital world where structured data is dominant.

One of the ongoing challenges faced by those preparing financial statements or other business reports with XBRL is managing change within the source taxonomy. In existing business reporting systems and methods using XBRL, migrating an XBRL representation of a business document from a current or older XBRL taxonomy to a new updated taxonomy is a laborious and error-prone task. Because of the complexities, the time and expense associated with migrating XBRL documents from one taxonomy to a new taxonomy has traditionally been very high, resulting in many XBRL documents continuing to be based upon deprecated taxonomies rather than being updated to the latest taxonomies.

SUMMARY

According to an embodiment, an XBRL extension taxonomy concept replacement system includes: a computer processor having a memory on which a program executable by the processor is stored for performing a method of XBRL extension taxonomy concept replacement; an XBRL taxonomy module including an XBRL extension taxonomy having XBRL extension taxonomy concepts and an XBRL base taxonomy having related XBRL base taxonomy concepts; and an automated superfluous XBRL extension taxonomy concept detection module that analyzes an XBRL document having XBRL tags and identifies an XBRL extension taxonomy concept of an XBRL extension taxonomy that is superfluous in comparison with an XBRL base taxonomy concept of an XBRL base taxonomy upon which the XBRL extension taxonomy is based.

The XBRL extension taxonomy concept replacement system may further include a concept replacement module that replaces the identified superfluous XBRL extension taxonomy concept with the XBRL base taxonomy concept in the XBRL document.

The XBRL extension taxonomy concept replacement system may further include a user interface module that presents information of the identified XBRL extension taxonomy concept and corresponding information of the XBRL base taxonomy concept to a user and receives an instruction to perform the replacement of the identified superfluous XBRL extension taxonomy concept with the XBRL base taxonomy concept in the XBRL document in response thereto.

The information may include a text string representing a name of the XBRL extension taxonomy concept and a text string representing a name of the XBRL base taxonomy concept.

The user interface module may present a figure of merit regarding the similarity of the XBRL extension taxonomy concept and the XBRL base taxonomy concept.

The figure of merit may include an edit distance between a text string in the XBRL extension taxonomy concept and a corresponding text string in the XBRL base taxonomy concept.

The figure of merit may include an edit distance between a name of the XBRL extension taxonomy concept and a corresponding name of the XBRL base taxonomy concept.

The figure of merit may include a similarity of a name of the XBRL extension taxonomy concept and a corresponding name of the XBRL base taxonomy concept based at least in part on whether a word included in the name of the XBRL extension taxonomy concept is a synonym of a corresponding word included in the corresponding name of the XBRL base taxonomy concept.

The XBRL extension taxonomy concept replacement system may further include an XBRL concept search module that searches for XBRL concepts matching search conditions within at least one of the XBRL document, the XBRL extension taxonomy, and the XBRL base taxonomy.

The XBRL extension taxonomy concept replacement system may further include a business document editor module that facilitates tagging of business document entries with XBRL tags using the XBRL taxonomy module.

According to another embodiment, a method of performing XBRL extension taxonomy concept replacement includes analyzing, by a computer processor, an XBRL document having XBRL tags to identify an XBRL extension taxonomy concept of an XBRL extension taxonomy that is superfluous in comparison with an XBRL base taxonomy concept for an XBRL base taxonomy upon which the XBRL extension taxonomy is based.

The method may further include replacing the identified superfluous XBRL extension taxonomy concept with the XBRL base taxonomy concept in the XBRL document.

The method may further include presenting information of the identified XBRL extension taxonomy concept and corresponding information of the XBRL base taxonomy concept to a user and receiving an instruction to perform the replacement of the identified superfluous XBRL extension taxonomy concept with the XBRL base taxonomy concept in the XBRL document in response thereto.

The analyzing may include comparing the XBRL extension taxonomy concept with a plurality of XBRL base taxonomy concepts and determining a figure of merit indicating a level of similarity between the XBRL extension taxonomy concept and each of the plurality of XBRL base taxonomy concepts.

The method may further include indexing concepts of the XBRL extension taxonomy against concepts of the XBRL base taxonomy based on the figure of merit determined for each pair of the XBRL extension taxonomy concepts and the plurality of XBRL base taxonomy concepts.

The figure of merit may include an edit distance between a text string in the XBRL extension taxonomy concept and a corresponding text string in the XBRL base taxonomy concept.

The figure of merit may include an edit distance between a name of the XBRL extension taxonomy concept and a corresponding name of the XBRL base taxonomy concept.

The figure of merit may include a similarity of a name of the XBRL extension taxonomy concept and a corresponding name of the XBRL base taxonomy concept based at least in part on whether a word included in the name of the XBRL extension taxonomy concept is a synonym of a corresponding word included in the corresponding name of the XBRL base taxonomy concept.

The method may further include tagging business document entries with XBRL tags using the XBRL taxonomy module.

The method may further include searching for XBRL concepts matching search conditions within at least one of the XBRL document, the XBRL extension taxonomy, and the XBRL base taxonomy.

BRIEF DESCRIPTION OF THE DRAWINGS

The above and other features and advantages of the invention will become more apparent by describing in detail exemplary embodiments thereof with reference to the attached drawings listed below.

FIG. 4 illustrates a window of a computer software user interface for new XBRL concept search, according to an embodiment.

FIG. 5 illustrates a window of a computer software user interface for deprecated XBRL concept search, according to an embodiment.

DETAILED DESCRIPTION

Figure 1:
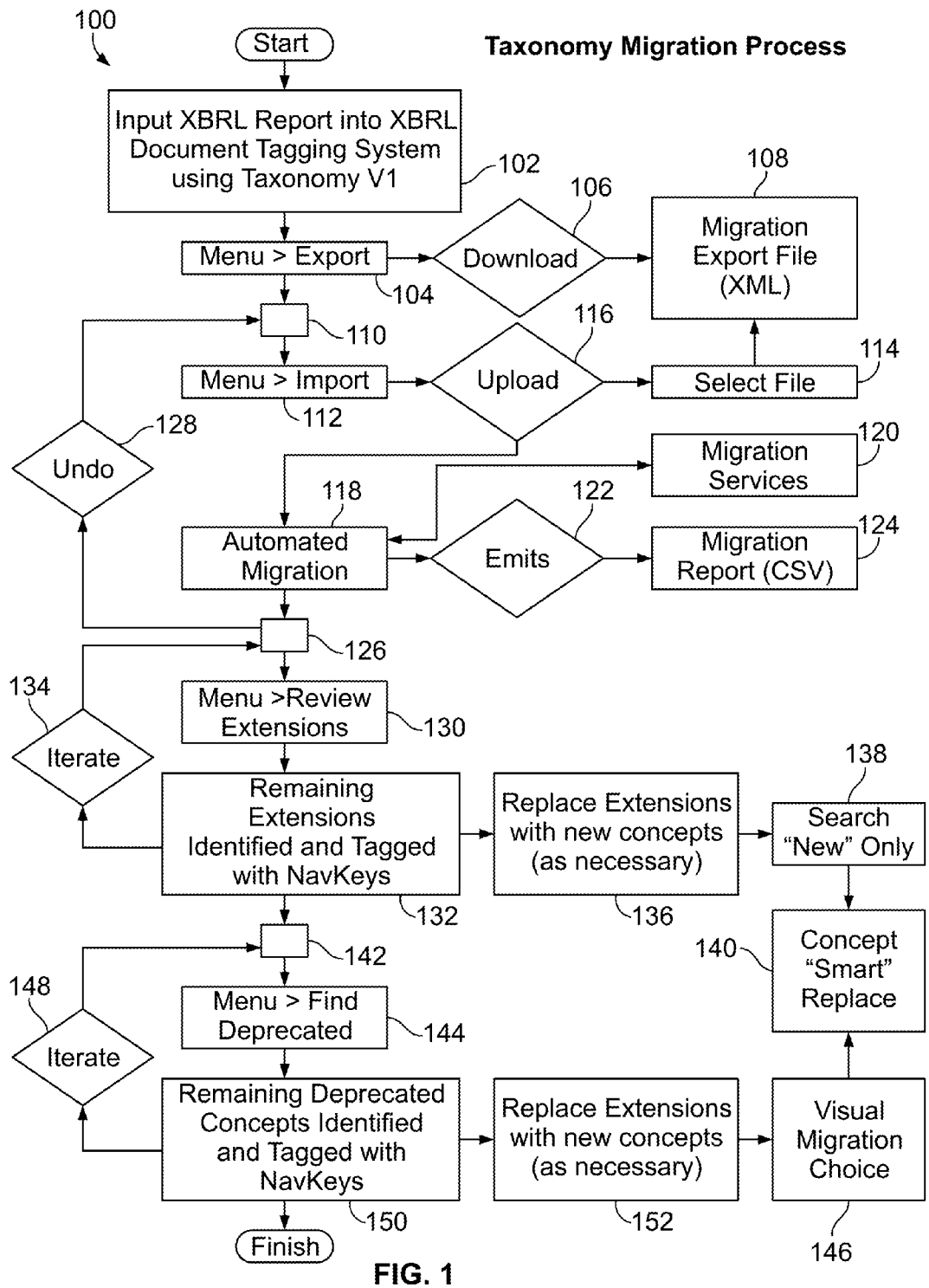
FIG. 1 illustrates a process for XBRL taxonomy migration, according to an embodiment.

Authoritative sources of reporting concepts for XBRL taxonomies change over time for several valid reasons. Keeping up with these changes is important for those who prepare business documents such as financial statements or other business reports according to the XBRL taxonomies, although it is a challenging task.

First and foremost, since XBRL taxonomies are models that mirror or implement more general standards, any evolution or change to an underlying standard can have a direct bearing on the XBRL taxonomy model that represents the standard. These changes can vary from the addition of new items to support fundamentally new regulation/practice or deprecation of an item. (When an XBRL item is deprecated, the item is identified as being obsolete, but is not deleted outright). However, the business standards are only half of the equation. Technical specification standards are also mirrored by the XBRL taxonomies, and while the technical specification standards are stable, they are not static. Second, as the XBRL model starts to be used in practice, certain modeling inconsistencies or invalid assumptions may break down, which may cause a structural reworking of XBRL taxonomies to improve ongoing clarity. Third, in an open environment (e.g., an environment that allows for XBRL extension taxonomies), standards bodies may choose to adopt a set of common practice extensions that are already in use by an industry segment to promote ongoing alignment of subsequent reports. Finally, but hopefully least common, is the correction of one or more model meta attributes due to error in the prior version of the XBRL taxonomy.

The problem of migrating from one XBRL taxonomy version to another one is not a new one to XBRL, and as a community, certain strides have been made to standardize a process for the identification of such changes between two versions of a taxonomy (e.g., XBRL Versioning Specification). This difference between two versions can serve as a set of highly technical release notes by identifying the moving parts. However, most software that exists today that understands the XBRL Versioning Specification can produce a difference file (e.g., change list) of two taxonomies and provide a list of changes, and possibly even a visual representation or blackline. While this sort of difference reporting is beneficial, this is far from being ideal. Given this starting point, a preparer of an XBRL document that is tasked with migrating from a current XBRL taxonomy to a new XBRL taxonomy still bears the burden of sifting through a change list that while correlated to the preparer's custom taxonomy, is disjoint from the preparer's customized taxonomy version. The preparer additionally bears the burden of applying those changes in the change list using a different piece of XBRL software (which may be a best case scenario) or utilizing a general text editor to perform an operation to find and replace XBRL text in the raw XBRL files themselves (which may be a worst case scenario).

Embodiments take a multifaceted approach to addressing this problem in a holistic/integrated fashion. By leveraging the structured data of the source taxonomy, embodiments include a process that automates as many decisions in the migration process as possible. In areas where preparer judgment is necessary, a logical integrated starting point may be provided instead of a disjoint tool or tertiary report to consider.

FIGS. 1-9 describe a workflow that facilitates XBRL taxonomy migration with minimal external support and no editing of XBRL source files by hand or use of another tool. In the embodiments, several different patterns for migration from one XBRL taxonomy to a new XBRL taxonomy may be addressed. The migration patterns are described as follows:

1) Direct Mapping—The XBRL concept in the old taxonomy is mapped directly to an XBRL concept in the new taxonomy with the same name.

2) One-to-One Mapping (Different Concept)—An equivalent XBRL concept in the new taxonomy is mapped to by an XBRL concept in the old taxonomy that is now considered deprecated.

3) One-to-One Mapping (Different Concept or Attribute Change)—Where a new XBRL concept may simply have an attribute change compared to an old XBRL concept, the new XBRL concept in the new taxonomy is mapped to by the old XBRL concept in the old taxonomy that is now considered deprecated.

4) One-to-Many Mapping (Increased Granularity)—Multiple new XBRL concepts of greater specificity exist in the new taxonomy which amount to the now deprecated XBRL concept when summed together.

5) One-to-Many Mapping (Choice)—Two or more different XBRL concepts exist in the new taxonomy that are potentially valid migration paths from the deprecated XBRL concept in the old taxonomy, and the preparer may choose between the new XBRL concepts.

6) Many-to-One Mapping (Dimensionalized)—Multiple XBRL concepts in the old taxonomy are deprecated and consolidated into a new XBRL concept in the new taxonomy, and the new XBRL concept should now be segmented by an axis and a member at the fact usages of the new XBRL concept.

7) Many-to-One Mapping (Encompassing)—Multiple XBRL concepts of greater specificity in the old taxonomy are deprecated and replaced by a new aggregating XBRL concept in the new taxonomy. If fact collisions exist, the facts should be segmented by an axis or new extensions created to support this roll-up.

8) Bridge Mapping—An official taxonomy concept (or one referenced by the official taxonomy) appears to be no longer supported and no migration path is provided to the new XBRL taxonomy. A new extension may be created to bridge this gap in the new taxonomy.

Embodiments of automated migration from an older taxonomy to a newer taxonomy may cover migration on all patterns except for #4 and #5 above, because patterns #4 and #5 may require a user choice between new XBRL concepts. Other patterns may include follow-up actions that are detailed in a report of an embodiment of an XBRL automated taxonomy migration process.

FIG. 1 illustrates a process for XBRL taxonomy migration 100, according to an embodiment. The illustrated process begins at a step 102 by inputting an XBRL report into an XBRL document tagging system that uses an XBRL taxonomy version 1. This should not be construed as limiting, as the taxonomy version may be any number in various embodiments, and "version 1" is used here only for convenience of description. The XBRL report may be a report which is fully tagged with XBRL tags, for example, a 10-Q or 10-K document. The report may be tagged using one or more different taxonomies simultaneously, and only one of the multiple taxonomies may be migrated at a given time while the other taxonomies remain unchanged.

After entering the XBRL report, at a step 104 a user may select a menu option "Menu > Export" to download, at a step 106, the XBRL report from within the system's internal memory and data structures into an XML file called the migration export file 108. After the export is completed, the process 100 reaches a milestone or stopping point 110, at which point the taxonomy migration process 100 may be temporarily stopped so that it may be resumed at a future time as is convenient or desired by the user.

When the user is ready to continue migrating the XBRL document from a "version 1" taxonomy to a different version of the taxonomy, at a step 112 the user may select a menu option "Menu > Import" to select the migration export file 108 at a step 114 and at a step 116 upload the XML migration export file 108 of the XBRL document using the "version 1" taxonomy which was previously downloaded into the system for migrating to a new and different target XBRL taxonomy version, e.g., "version 2".

Note that a source document (e.g., 10-Q or 10-K) may include tags from multiple different XBRL taxonomies simultaneously, but only one of the multiple different XBRL taxonomies may be undergoing migration from one version (e.g., "version 1") to another (e.g., "version 2"). The upload process may gather metadata from within the migration export file that corresponds to a selected taxonomy that is being migrated from "version 1" to "version 2" for efficient processing during migration, such that tags of different taxonomies are not affected by the migration.

Once the upload of the migration export file has been completed, an automated migration subprocess 118 may begin. The automated migration subprocess 118 may call a migration services process 120 to perform part or all of the substantive automated migration steps. The migration services process 120 may be performed on a same computer system (e.g., local computer system) as the overall taxonomy migration process 100, or the migration services process 120 may be performed remotely by another computer system (e.g., remote computer system), for example, by a compute server located elsewhere and communicatively coupled with the local computer system over a computing network, e.g., a WiFi network, an Ethernet network, or the Internet. The migration services process 120 may be a Software as a Service (SaaS) product offered to the user in "the cloud" for cloud computing. The automated migration process 120 may perform migrations which do not require additional user input or decisions, but may be completely automated. For example, the automated migration process may perform migration patterns 1-4 as discussed above.

The automated migration process 118 may output, at a step 122, a migration report 124 that includes descriptions of the changes made when migrating the XBRL document from "version 1" to "version 2" of the taxonomy. The migration report 124 may be a data file following a comma separated value (CSV) format, or may be displayed on a graphical user interface (GUI) for the user to review. The report 124 may include information about each migration such as severity, message, migration pattern, type, official notes, original concept, migrated concept, and notes from the taxonomy migration process 100. At the conclusion of the automated migration process 118, the taxonomy migration process 100 may reach another milestone 126. The automated migration process 118 is discussed in greater detail with respect to FIG. 2. An undo step 128 may return the taxonomy migration process 100 to milestone 110.

For taxonomy migration paths which cannot be fully automated and require some additional user input, iterations of assisted migration processes may be performed. By selecting a menu item "Menu > Review Extensions" at a step 130, a user may review taxonomy customizations or extensions that could not be automatically migrated in the automated migration process 118. Remaining extensions which are not automatically migrated in the automated migration process 118 may be identified and tagged with metadata called "NavKeys" at a step 132 herein for identification and processing. In a user interface, a notification panel may include a list of extensions that have yet to be migrated, and the items on the list may be checked off as the user iterates (via a step 134) over the process 130 associated with "Menu > Review Extensions" and migrates the items from "version 1" to "version 2." Following the last iteration over step 132, the taxonomy migration process 100 may reach a milestone 142.

For each extension in the list, the user may replace the extension with a new XBRL concept as needed at a step 136 to migrate from the "version 1" taxonomy to the "version 2" taxonomy. The user may perform a new concept search at a step 138 in the "version 2" taxonomy, and at a step 140 may perform a "smart" concept replacement of the extension of the "version 1" taxonomy with a concept in "version 2". If the extension of "version 1" matches a new concept in the "version 2" taxonomy, the extension may be automatically mapped to and replaced by the new concept.

Figure 9:
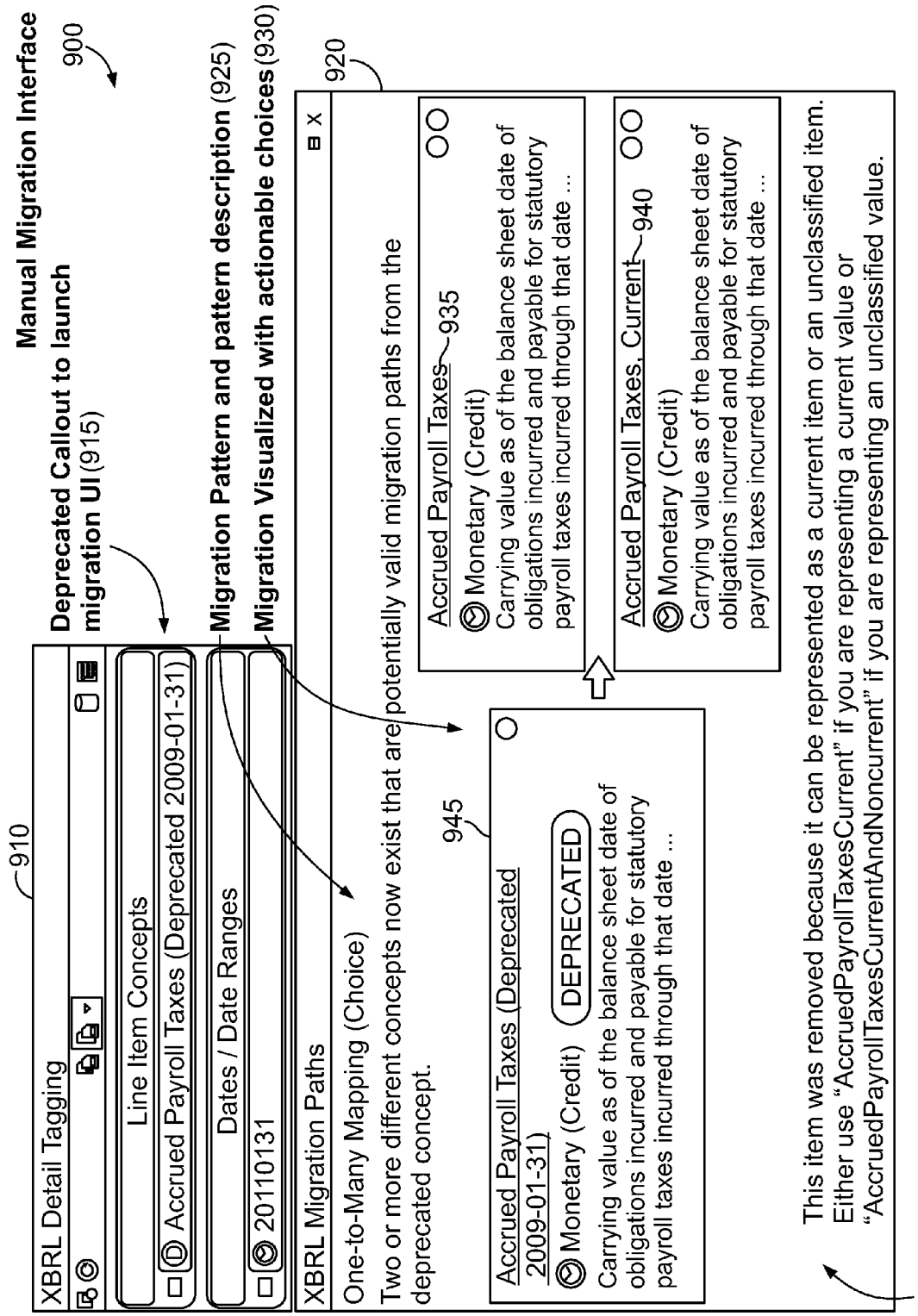
FIG. 9 illustrates a computer software user interface for manual XBRL migration, according to an embodiment.

A user may find deprecated concepts in the "version 1" taxonomy that need user-input to be migrated to the "version 2" taxonomy by selecting a menu item "Menu > Find Deprecated" at a step 144. For example, a deprecated concept from the "version 1" taxonomy may have a one-to-many mapping migration pattern that requires the user to choose among several different concepts in the "version 2" taxonomy. The process to find deprecated concepts 144 may be performed by the user in a similar manner as the process to review extensions 130 described above, except that the user may perform a visual migration choice process 146 rather than a search new concept process 138. The visual migration choice process 146 is illustrated in FIG. 9.

The process to find deprecated concepts 144 may be iterated (via a step 148) until a number of entries in a list of deprecated concepts in a notification panel of the user interface dwindles down to zero entries. For each deprecated concept in the list, the user may replace the extension with a new XBRL concept as needed at a step 152 to migrate from the "version 1" taxonomy to the "version 2" taxonomy. Remaining deprecated concepts may be identified and tagged with NavKeys at a step 150 herein for identification and processing. Upon completion of the iteration (via step 148) over the process to find deprecated concepts 144 and process to identify and tag remaining deprecated concepts with NavKeys 150, the taxonomy migration process 100 may be complete.

Figure 2:
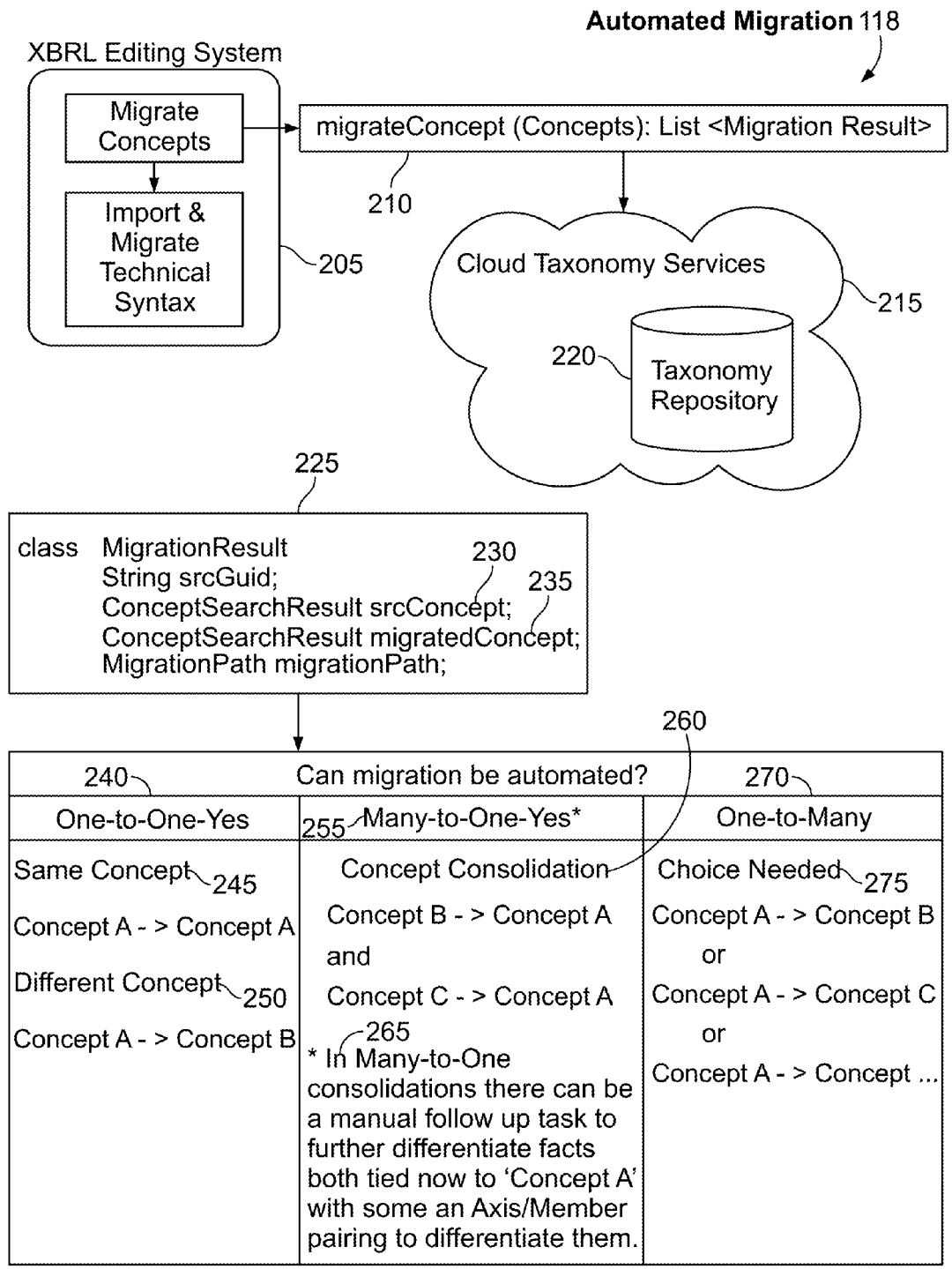
FIG. 2 illustrates the automated migration subprocess of FIG. 1 in more detail, according to an embodiment.

FIG. 2 illustrates the automated migration subprocess 118 of FIG. 1 in more detail, according to an embodiment. Within the XBRL editing system 205 performing the taxonomy migration process 100, a callout may be made using the call "migrateConcepts(concepts):List<MigrationResult>" 210 to a migration services process such as a cloud taxonomy services process 215. The cloud taxonomy services process 215 may include a repository of taxonomies 220. The cloud taxonomy services process 215 outputs a result including a list of concepts for migration which may be represented in the form of a class 225. Whether a migration from a source concept 230 (e.g., "version 1" concept) to a migrated concept 235 (e.g., "version 2" concept) may be determined according to the migration pattern, as discussed above. For example, in a one-to-one mapping 240, the concepts may be automatically migrated, either to a same concept 245 or to a different concept 250. As another example, in a many-to-one mapping 255, whether the migration can be automated may be dependent upon whether fact collisions occur. In the many-to-one migration pattern of concept consolidation 260, both concept B and concept C in the "version 1" taxonomy may be mapped to concept A in the "version 2" taxonomy. There may be a manual follow-up user task 265 to further differentiate facts that are both tied to concept A in the "version 2" taxonomy but that were tied to different concepts in the "version 1" taxonomy. The differentiation may include some axis and member pairing of the fact usages. As a third example, in a one-to-many mapping 270, the user may manually choose, in a choice pattern 275, to which of several different concepts in the "version 2" taxonomy the concept in the "version 1" taxonomy should be mapped.

Figure 3:
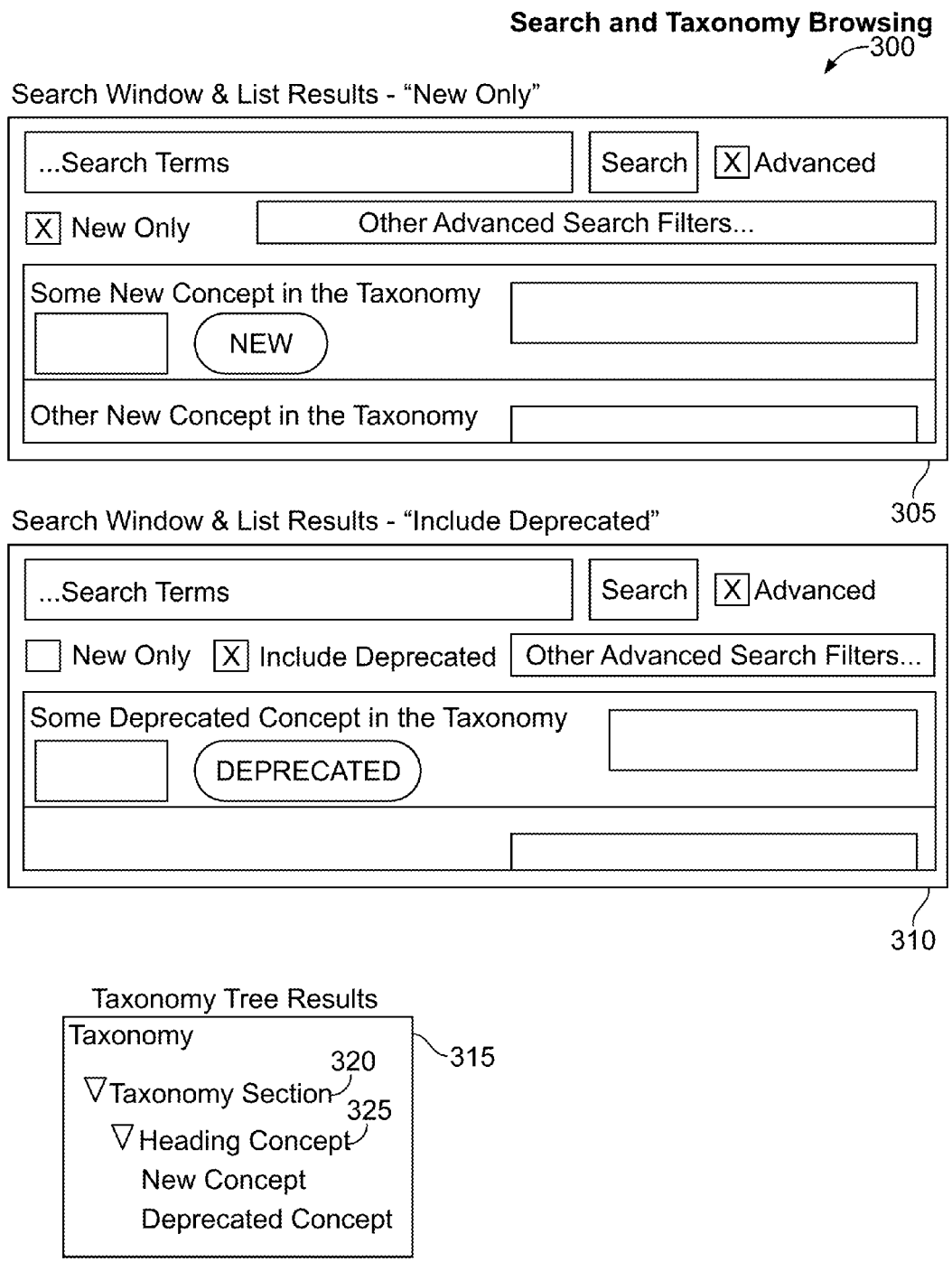
FIG. 3 illustrates a computer software user interface for XBRL search and taxonomy browsing, according to an embodiment.

FIG. 3 illustrates a computer software user interface 300 for XBRL search and taxonomy browsing, according to an embodiment. The user interface 300 for XBRL search and taxonomy browsing may be used during the review extensions process 130 of FIG. 1. In a search window 305, the user may choose to search for only new concepts in the "version 2" taxonomy as illustrated at the top of FIG. 3. Alternatively, in the search window 310, the user may choose to search for deprecated concepts in the "version 2" taxonomy as illustrated in the middle of FIG. 3. In addition, the user may choose to search for both new and deprecated concepts in the "version 2" taxonomy. The search results may be provided to the user as a taxonomy tree 315, for example as illustrated in the bottom of FIG. 3. The taxonomy tree 315 may have different sections 320, each of which include different concepts 325. Each of the listed concepts may indicate whether the concept is new or deprecated.

FIG. 4 illustrates a window of a computer software user interface 400 for new XBRL concept search, according to an embodiment. The new XBRL concept search interface 400 of FIG. 4 may be an embodiment of performing the new concept search 305 at the top of FIG. 3. The bottom of the window 405 may include a scrollable window pane 410 showing results from the search indicating whether the concepts are new (415).

FIG. 5 illustrates a window of a computer software user interface 500 for deprecated XBRL concept search, according to an embodiment. The deprecated XBRL concept search interface 500 of FIG. 5 may be an embodiment of performing the deprecated concept search 310 at the middle of FIG. 3. The bottom of the window 505 may include a scrollable window pane 510 showing results from the search indicating whether the concepts are deprecated (515). The deprecated concept search may include deprecated concepts as well as other concepts that meet the search term. In the example illustrated in FIG. 5, the search term 520 is "cash", and all concepts that match "cash", including deprecated concepts, are shown in the results listing 525.

Figure 6:
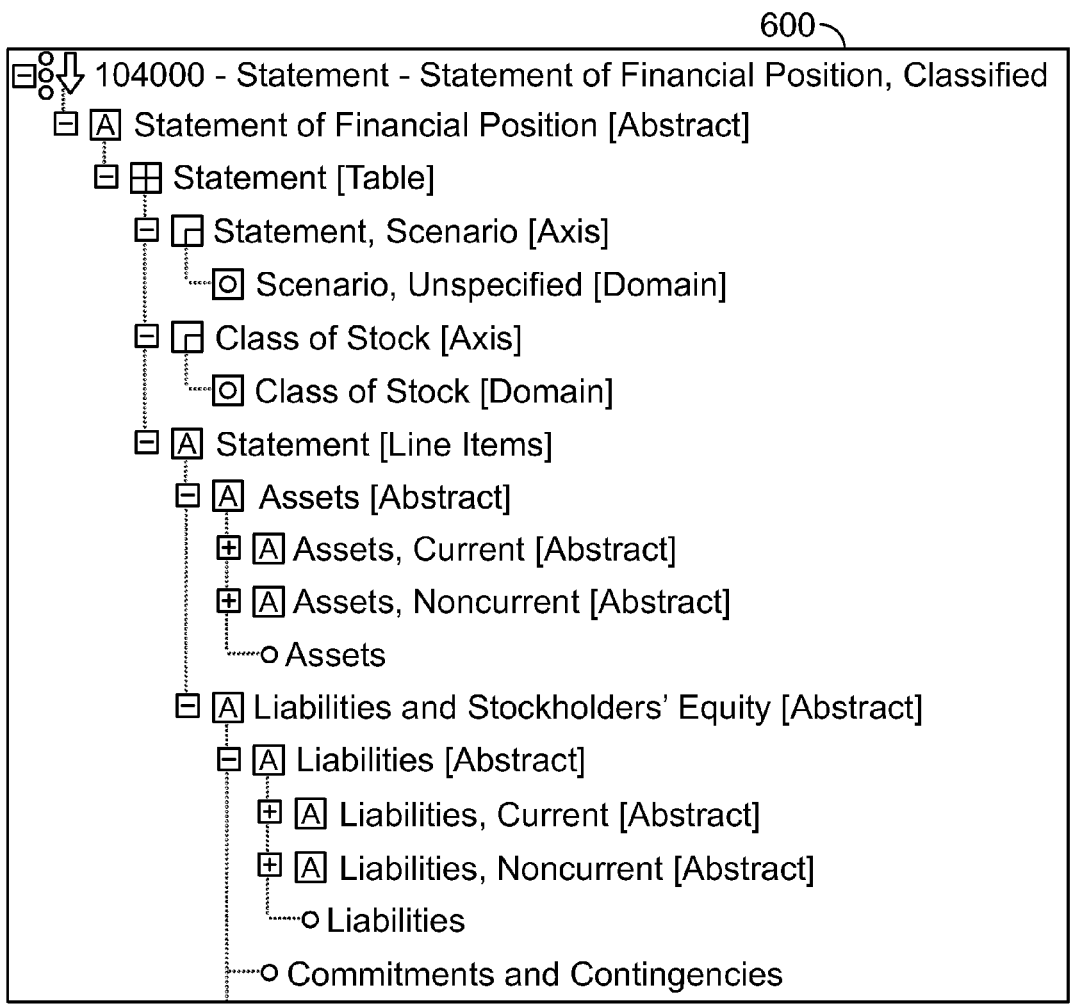
FIG. 6 illustrates a window of a computer software user interface for a new XBRL concept callout in a taxonomy tree, according to an embodiment.

FIG. 6 illustrates a window 600 of a computer software user interface for a new XBRL concept callout in a taxonomy tree, according to an embodiment. The window 600 may show the search results in a taxonomy tree if the search window 405 of FIG. 4 has the button "taxonomy tree" 420 selected. The taxonomy tree may highlight the new taxonomy concepts or show the new taxonomy concepts with a different color, in a different typeface, or adjacent to a unique symbol, for example.

Figure 7:
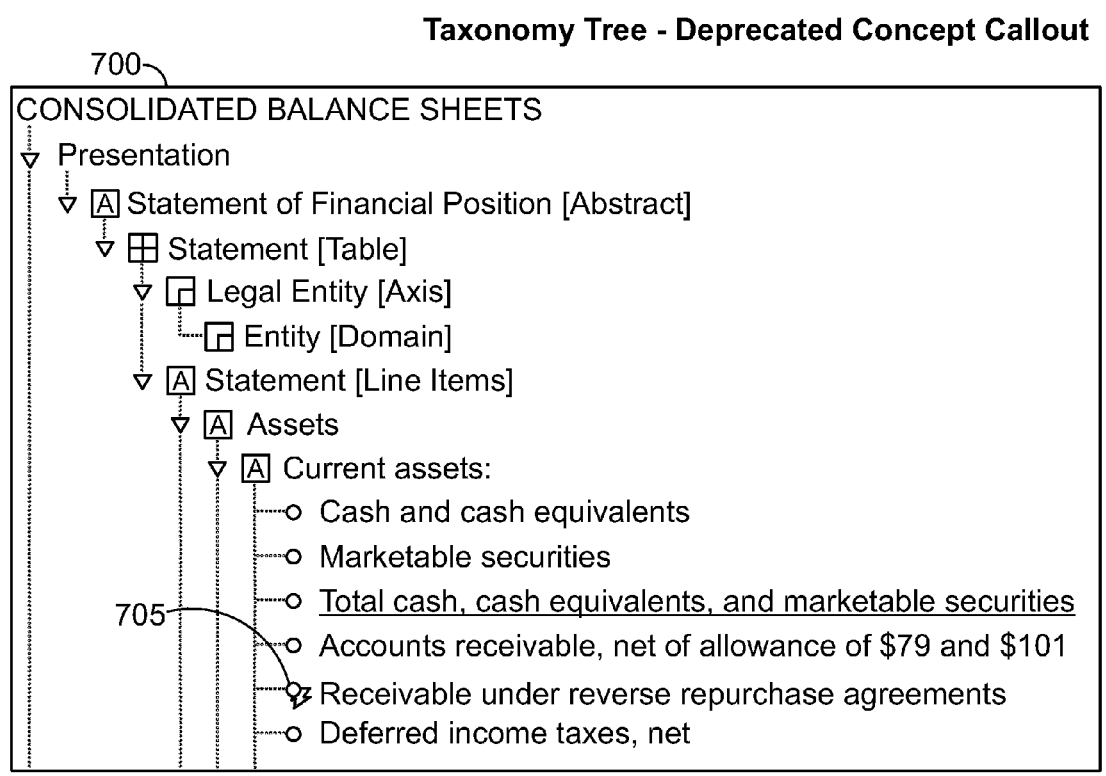
FIG. 7 illustrates a window of a computer software user interface for a deprecated XBRL concept callout in a taxonomy tree, according to an embodiment.

FIG. 7 illustrates a window 700 of a computer software user interface for a deprecated XBRL concept callout in a taxonomy tree, according to an embodiment. The window 700 may show the search results in a taxonomy tree if the search window 505 of FIG. 5 has the button "taxonomy tree" 530 selected. The taxonomy tree may highlight the deprecated taxonomy concepts 705 or show the deprecated taxonomy concepts 705 with a different color, in a different typeface, or adjacent to a unique symbol, for example.

Figure 8:
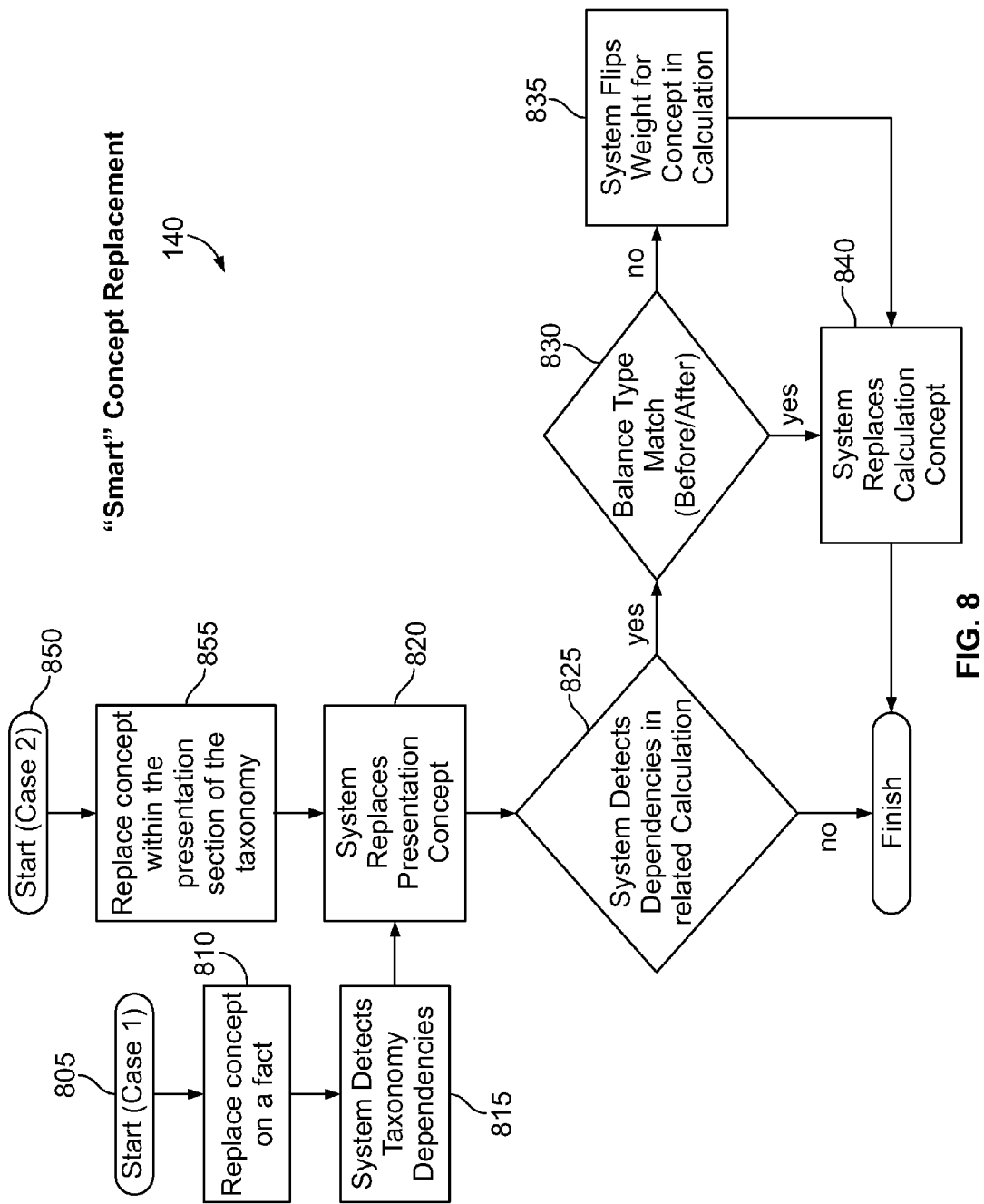
FIG. 8 illustrates the "smart" automated XBRL concept replacement subprocess of FIG. 1 in more detail, according to an embodiment.

FIG. 8 illustrates the "smart" automated XBRL concept replacement subprocess 140 illustrated in FIG. 1 in more detail, according to an embodiment. A goal of the "smart" automated XBRL concept replacement is to ensure that calculations performed before the concept replacement still produce the correct (or same) results after the concept replacement. The "smart" concept replacement process may be a convenient feature for a user to ensure that when concepts are replaced while migrating from a "version 1" taxonomy to a "version 2" taxonomy, adjustments are automatically made throughout the taxonomy and/or XBRL document to maintain the overall accuracy of the data represented by the XBRL document.

The process of FIG. 8 may begin starting from one of two different scenarios. In a first case 805, a concept on a fact may be replaced at a step 810. In other words, the migration of the concept may be performed from the perspective of the tagged value in the XBRL document. In this case, the system may detect taxonomy dependencies within the XBRL document at a step 815 and replace the presentation concept accordingly at a step 820. Then, the system may detect dependencies in calculations related to the replaced concept at a step 825. For example, a calculation (e.g., a+b+c=total) may compute a formula that uses the replaced concept. If the system does detect a dependency, a balance type of the concept (e.g., debit or credit) of the original "version 1" taxonomy concept and the replacement "version 2" taxonomy concept are compared to one another at a step 830. For example, if the original concept is a debit and the replacement concept is a credit, then the balance type of the concepts do not match and the weight of the replacement concept is flipped from being an addition of a concept to the total to a subtraction of the concept from the total at a step 835. This is done in order to maintain the integrity of the calculations using the replacement concept when the original concept is replaced with the replacement concept at a step 840. If the original and replacement concepts are both debits or both credits, then the concepts may be considered to match and there is no flipping performed when the original concept is replaced by the replacement concept at the step 840.

For example, in the calculation assertion a+b+c=total, there are four facts in the XBRL instance document corresponding to each of the concepts a, b, c, and total. An XBRL processor would sum the facts corresponding to a+b+c and compare the computed sum with the fourth fact corresponding to total in this example. An arc (an XML element) having a weight attribute (which may be either 1 or –1) represents a relationship between each of the facts of a, b, and c and the fact of total. When the weight attribute of the arc is 1, the contributor is added to arrive at the total, and when the weight is –1, the contributor is subtracted to arrive at the total. In the calculation assertion a+b+c=total where b is a concept with a debit balance type, the concept b may be replaced with a concept d where d is a concept with a credit balance type. After the replacement of concept b with concept d, the calculation assertion would be updated to be represented as a–d+c=total in order to maintain consistency. Thus, the weight of the arc corresponding to the replacement concept d in the calculation assertion a–d+c=total is adjusted or flipped in comparison with the arc corresponding to the replaced concept b in the calculation assertion a+b+c=total. As illustrated herein, in an embodiment, the "smart" concept replacement automates the adjustment of the weight of the arcs to maintain consistency without requiring manual editing of calculation assertions by the user.

In a second case 850, a concept within the presentation section of the taxonomy may be replaced at a step 855. The second case is performed similarly as the first case, except that a detection of taxonomy dependencies may not be performed prior to the system replacing the presentation concept at the step 820.

FIG. 9 illustrates a computer software user interface 900 for manual XBRL migration, according to an embodiment. A user may also manually migrate individual XBRL callouts from a "version 1" taxonomy to a "version 2" taxonomy. For example, a user may utilize an XBRL tagging interface to view concepts in an XBRL document. If the user sees that a concept is deprecated (915) as illustrated in the top left of FIG. 9, the user may start a manual taxonomy migration process using a manual migration interface 920 as shown in the lower right of FIG. 9. The system may present a number of relevant migration patterns (925) based on the deprecated concept (e.g., one-to-many mapping) to the user and may visualize the relevant migration patterns for the user (930). The migration patterns may be presented along with descriptions thereof. The interface window 920 may show a plurality of options from which the user may choose in performing the migration. For example, in the one-to-many mapping, the user may be able to select between "Accrued Payroll Taxes" (935) or "Accrued Payroll Taxes, Current" (940) when migrating the deprecated concept "Accrued Payroll Taxes (Deprecated 2009-01-31)" (945). The interface window may also show some official notes (950) from the taxonomy about the deprecated concept to help the user decide to which new concept to migrate the deprecated concept. The interface notes 950 may, for example, explain why the user may want to choose one new concept over another new concept.

Figure 10:
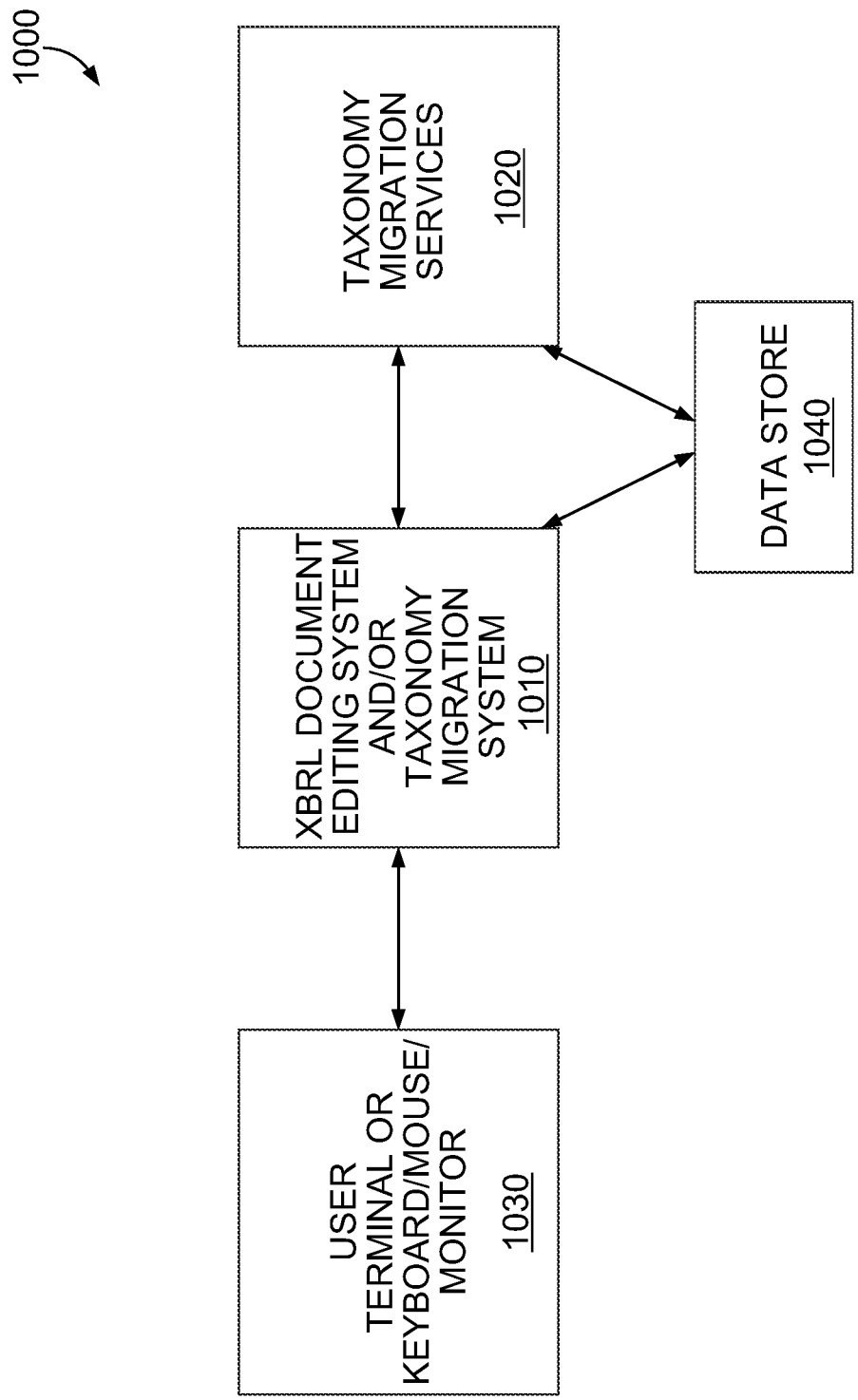
FIG. 10 illustrates an example architecture including the XBRL taxonomy migration system and a taxonomy migration services process in the cloud, according to an embodiment.

FIG. 10 illustrates an example architecture 1000 including the XBRL document editing system and/or taxonomy migration system 1010 and a taxonomy migration services process 1020 in the cloud, according to an embodiment. The XBRL document editing system and/or taxonomy migration system 1010 may connect to a user terminal or keyboard/mouse/monitor 1030. In various embodiments, a user may use the XBRL document editing system and/or taxonomy migration system 1010 on a local computer, or on a remote computer over a network. Likewise, in various embodiments, the taxonomy migration services process 1020 may operate on a computer local to the user, local to the XBRL document editing system and/or taxonomy migration system 1010, or remote from both over a network. In various embodiments, one or both of the XBRL document editing system and/or taxonomy migration system 1010 or the taxonomy migration services process 1020 may be implemented using client-server architectures or as SaaS products. Both the XBRL document editing system and/or taxonomy migration system 1010 and the taxonomy migration services process 1020 may connect to a data store 1040.

Figure 11:
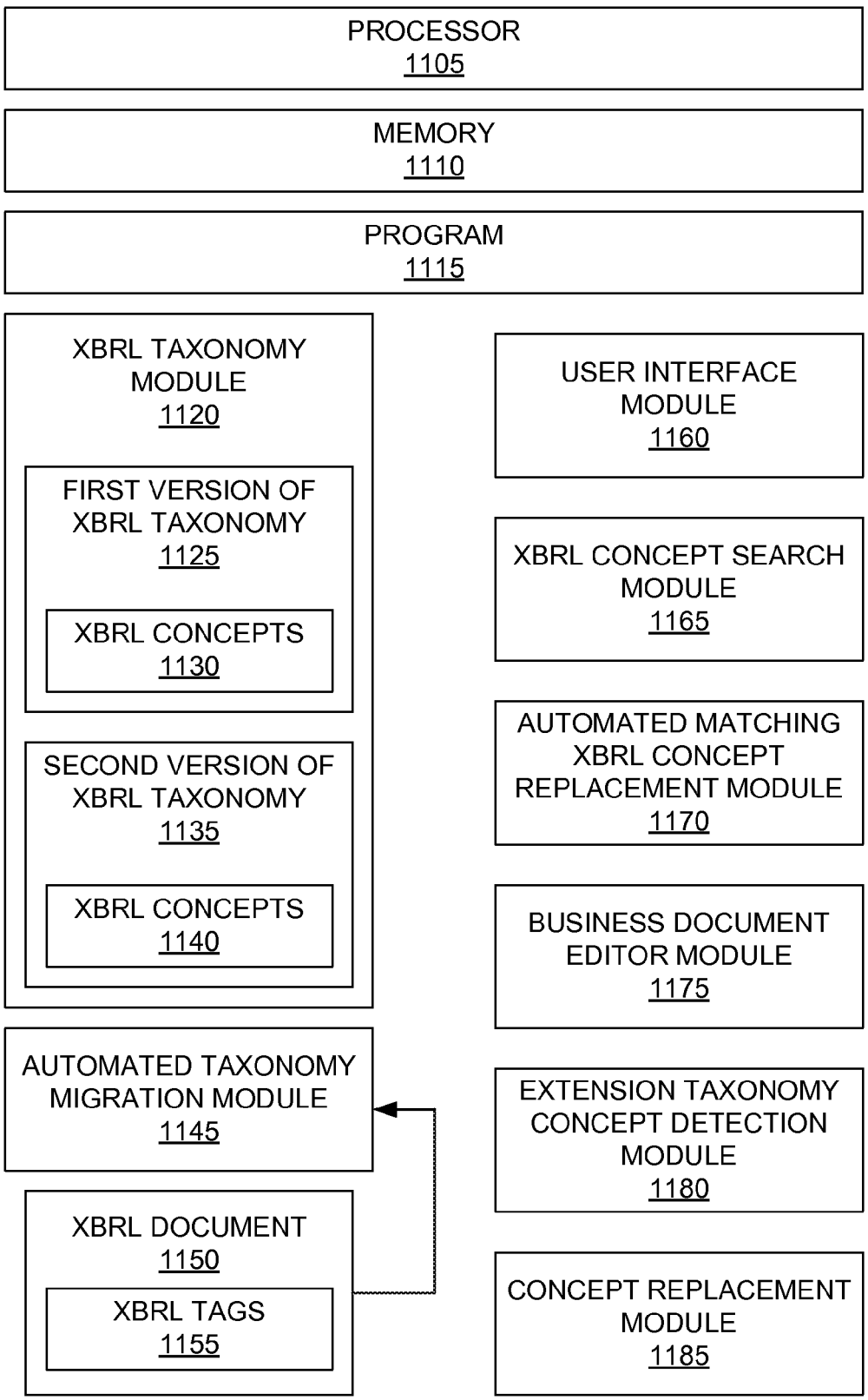
FIG. 11 illustrates an XBRL taxonomy migration system, according to an embodiment.

FIG. 11 illustrates an XBRL taxonomy migration system 1100, according to an embodiment. The XBRL taxonomy migration system 1100 includes a processor 1105 having a memory 1110 on which a program 1115 executable by the processor is stored for performing a method of XBRL taxonomy migration.

The XBRL taxonomy migration system 1100 also includes an XBRL taxonomy module 1120 including a first version of an XBRL taxonomy 1125 having XBRL concepts 1130 and a second version of the XBRL taxonomy 1135 having related XBRL concepts 1140.

The XBRL taxonomy migration system 1100 additionally includes an automated taxonomy migration module 1145 that facilitates migrating XBRL concepts 1130 of an XBRL document 1150 having XBRL tags 1155 by replacing XBRL concepts 1130 of the first version of the XBRL taxonomy with XBRL concepts 1140 of the second version of the XBRL taxonomy.

The XBRL taxonomy migration system 1100 may further include a user interface module 1160 that identifies and facilitates migrating specific XBRL taxonomy concepts within an XBRL document from the first to the second version of the XBRL taxonomy.

The XBRL taxonomy migration system 1100 may further include an XBRL concept search module 1165 that searches for XBRL concepts matching search conditions within at least one of the XBRL document 1150 and the first and second versions 1125 and 1135 of the XBRL taxonomy, respectively.

The XBRL taxonomy migration system may further include an automated matching XBRL concept replacement module 1170 that detects dependencies in calculations in the XBRL document 1150 using the migrating XBRL concepts 1130. When dependencies are detected, the XBRL taxonomy migration system 1100 may determine whether a balance type of a first version XBRL taxonomy concept 1130 matches a balance type of a second version XBRL taxonomy concept 1140 replacing the first version XBRL taxonomy concept 1130 in the XBRL document 1150. When the balance type of the first version XBRL taxonomy concept 1130 does not match the balance type of the second version XBRL taxonomy concept 1140, the XBRL taxonomy migration system 1100 may adjust a weight of an arc using the XBRL taxonomy concept 1140 in a calculation assertion when replacing the first version XBRL taxonomy concept 1130 with the second version XBRL taxonomy concept 1140 in the XBRL document 1150.

The XBRL taxonomy migration system 1100 may further include a business document editor module 1175 that facilitates tagging of business document entries with XBRL tags 1155 using the XBRL taxonomy module 1120.

In another embodiment, rather than migrating a document from using a first version of an XBRL taxonomy to using a second version of the XBRL taxonomy, it may be desired to replace concepts of an extension taxonomy used in conjunction with a base taxonomy with matching or duplicate concepts of the base taxonomy. For example, an extension taxonomy concept may exist and be used in an XBRL document which is superfluous because it duplicates the functionality of an existing concept in the base taxonomy upon which the extension taxonomy is based. This may occur when a user inadvertently creates and uses the extension taxonomy concept, unaware that a base taxonomy concept already exists that provides the desired functionality. It may be arduous and difficult to manually find and correct such superfluous extension taxonomy concepts, but embodiments discussed herein may help automate the process for efficiency and ease of use.

The superfluous extension taxonomy concepts may be identified by a superfluous extension taxonomy concept detection module 1180. The superfluous extension taxonomy concept detection module 1180 may be part of the executable program 1115 that executes on the processor 1105. The superfluous extension taxonomy concept detection module 1180 may index the concepts of the extension taxonomy against the concepts of the base taxonomy. In doing so, the superfluous extension taxonomy concept detection module 1180 may perform an analysis loop that analyzes all concepts of an extension taxonomy used by an XBRL document being analyzed in turn. Each concept in the extension taxonomy may be analyzed to determine the likelihood or probability that the concept is a duplicate of or superfluous in view of a concept in the base taxonomy on which the extension taxonomy is based. For each analyzed concept of the extension taxonomy, the superfluous extension taxonomy concept detection module 1180 may perform an analysis loop that analyzes all concepts of the base taxonomy upon which the extension taxonomy is based in turn. If the probability that the analyzed extension taxonomy concept is superfluous in comparison with an analyzed base taxonomy concept is determined to be high enough, the extension taxonomy concept may be identified and flagged for either replacement with the corresponding base taxonomy concept, or flagged for notification to a user of the possibility that the extension taxonomy concept is a superfluous or a duplicate of the corresponding base taxonomy concept.

The identified superfluous XBRL extension taxonomy concepts may be replaced by their identified corresponding XBRL base taxonomy concepts by a concept replacement module 1185. The concept replacement module 1185 may be an embodiment of the automated matching XBRL concept replacement module 1170 discussed herein with respect to FIG. 11. The replacement may be performed automatically or according to an instruction of a user.

For example, if the probability that the extension taxonomy concept is superfluous is over some high threshold, for example, 90%, then the extension taxonomy concept may be automatically replaced with the corresponding base taxonomy concept of which the extension taxonomy concept is determined to be likely duplicative. Alternatively, if the probability that the extension taxonomy concept is superfluous is over a lower threshold, for example, 50%, then the extension taxonomy concept may be flagged and identified to a user through a user interface and suggested to be replaced with the corresponding base taxonomy concept of which the extension taxonomy concept is determined to be likely duplicative. The user interface through which the user is flagged may be an embodiment of the user interface module 1160 discussed herein with respect to FIG. 11.

The process of detecting whether an extension taxonomy concept being evaluated is superfluous or duplicative of an existing base taxonomy concept may be performed by comparing an aspect of the extension taxonomy concept being evaluated against corresponding aspects in each of the base taxonomy concepts to determine a figure of merit representing the similarity. For example, the name of the extension taxonomy concept may be compared against all the names of base taxonomy concepts in the base taxonomy. An algorithm may perform the comparison and determine a figure of merit representing the similarity based on an edit distance between the text strings representing the names. An example of such an algorithm that may be used is the Levenshtein algorithm, for which the edit distance may be called the Levenshtein distance. The edit distance represents the number of single character edits (insertions, deletions, or substitutions) required to change one word or string into the other. The edit distance between two strings being compared represents how many edits would be required to transform one string into the other string. The edit distance is an example of a figure of merit representing how similar two compared text strings are, or how similar an extension taxonomy concept is to a compared base taxonomy concept. The edit distance is one of a larger family of distance metrics related to pairwise string alignments. The Levenshtein distance between two strings a, b is given by leva,b(|a|, |b|) where $$lev_{a,b}(i, j) = \begin{cases} \max(i, j) & \text{if } \min(i, j) = 0 \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{else} \end{cases} \quad \text{Eq. 1}$$

where $1_{(a_i \neq b_j)}$ is the indicator function equal to 0 when $a_i = b_j$ and equal to 1 otherwise. The first element in the minimum corresponds to deletion (from a to b), the second to insertion, and the third to match or mismatch, depending on whether the respective symbols are the same. The Levenshtein distance is only an example of a method of determining an edit distance. Other potential methods that may be used include the Damerau-Levenshtein distance, the longest common subsequence metric, the Hamming distance, sequence alignment algorithms such as the Smith-Waterman algorithm, and other methods for computing figures of merit for comparisons as known in the art.

As an example, consider a comparison of concept name strings between the extension taxonomy and the base taxonomy. A name string typically contains on the order of ten to a hundred characters. The name string is often comprised of a series of words concatenated together, for example AnnualIncomeConcept and AnnualExpenseConcept. For example, an extension taxonomy concept name BusinessExpensesConcept may be compared with a base taxonomy concept name BusinessExpenseConcept. Here, the extension taxonomy concept name string includes a plural version of the word "Expense" where the base taxonomy concept name string with which it is compared includes a singular version of the same word. This would be determined to have an edit distance of one, because it would take one single-character edit to transform one string to the other. In contrast, an extension taxonomy concept name string that adds the phrase "not" in front of a word used in the base taxonomy concept name string with which it is compared would be determined to have an edit distance of three.

These examples show how an edit distance of one vs. an edit distance of three can determine whether an extension taxonomy concept is similar to a base taxonomy concept with which it is compared, because creation of a plural may not be a substantive distance, but prepending "not" in front of a word may indicate a substantive difference between the compared concepts. To further illustrate, an extension taxonomy concept named ExpensesNotPaidConcept compared with a base taxonomy concept named ExpensesPaidConcept would be determined to have an edit distance of three. Assuming that there is not much substantive difference between BusinesslExpenseConcept and BusinessExpensesConcept discussed in the example above, an edit distance of one may be considered to indicate a high probability that the two concepts compared are duplicative. In contrast, assuming that there is significant substantive difference between ExpensesNotPaidConcept and ExpensesPaidConcept discussed above, the edit distance of three may be considered to indicate a low probability that the two concepts compared are duplicative. This is because merely making a word plural may be considered to be inconsequential and not have a substantive basis, while prepending a word with "not" may be considered to be substantive and change the meaning of the extension concept in comparison with the base concept with which it is compared. For example, the addition of the word "not" may indicate that the extension taxonomy concept uses a negative value, whereas the base taxonomy concept uses a positive value.

Other differences between character strings may be used to determine an edit distance, including one or more additional characters, omitted characters, replaced characters, transposition of a few characters, changed capitalization of characters, typographical errors, insertion of generic separator words or symbols, conjunctions, disjunctions, prepositions, and the like. In addition, other differences between character strings and words or word fragments contained within character strings may be used to determine other figures of merit relating to similarity besides edit distance.

In some embodiments, where the names of concepts are formed by concatenating numerous words together, the back-end detection module 1180 separates the strings representing the names of the extension taxonomy concepts and the base taxonomy concepts into their individual component words, and then compares the individual words from the names of each of the extension taxonomy concepts with the individual words from the names of each of the base taxonomy concepts in order to determine the edit distance or other figure of merit between the names of the extension taxonomy concept names and the base taxonomy concept names.

In some embodiments, the superfluous extension taxonomy concept detection module 1180 also compares synonyms and/or common variations on the words in the extension taxonomy concept names with the corresponding words in the base taxonomy concept names when determining the figure of merit. For example, a synonym may be determined to have a low edit distance, such as one, or a high figure of merit for similarity. The synonyms may be determined using a thesaurus, and may also include numerical strings being considered synonyms with the numbers written out in words. For example, "4" may be considered a synonym of "four." In addition, using the synonym comparison approach, plurals that are not formed by the simple addition of an "s" at the end of a word, such as "geese" in place of "goose" or "feet" instead of "foot," may be determined to have an edit distance of one or the same figure of merit for similarity as any other plural, even though they differ by more than a single changed character, because they are conceptually the same except for one being a plural of the other. Also, using the synonym approach, words and parts of words such as "non," "un," "with" vs. "without," "above" vs. "below," "high" vs. "low," etc. may be compared and assigned an edit distance or figure of merit based on differences in meaning which these word parts may convey. In some embodiments, the edit distance or figure of merit may be expanded into a more complex scoring mechanism that identifies both a literal edit distance per an algorithm such as the Levenshtein algorithm in addition to a conceptual difference score based on whether words or word parts are synonyms, plurals, antonyms, etc. The conceptual difference score may also be dependent upon which words or word parts are identified as being different. For example, addition of the word "not" in an extension taxonomy concept name compared to the corresponding base taxonomy concept name may be considered to have a large conceptual difference score, while addition of the word "the" may be considered to have a low conceptual difference score, although the edit distance between the compared strings when "not" is added may be the same as when "the" is added.

In some embodiments, variable names in the extension taxonomy concepts may be compared with corresponding variable names in the base taxonomy concepts in a manner as described above. In other embodiments, additional character strings, aspects, characteristics, or field names of the extension taxonomy concepts may be compared with corresponding character strings, aspects, characteristics, or field names of the base taxonomy concepts.

After the superfluous extension taxonomy concept detection module 1180 identifies and flags all extension taxonomy concepts used in the XBRL document that may be superfluous or duplicative of XBRL taxonomy concepts in a base taxonomy or otherwise unnecessary in view of a corresponding base taxonomy concept, a user interface may present the flagged extension taxonomy concepts to the user so that the user can determine whether to replace the flagged extension taxonomy concepts with the identified corresponding base taxonomy concepts. This user interface may be a part of the user interface module 1160 described above. The user interface may present all the details of the flagged extension taxonomy concept together with the details of the identified corresponding base taxonomy concept so that the user can personally compare the concepts and make an informed decision based on all the information regarding the concepts as to whether the replacement should be made or not. The user interface may also make a recommendation and/or report to the user the figure of merit indicating how similar the compared concepts are to aid the user in making the decision. In some embodiments, the superfluous extension taxonomy concept detection module 1180 may determine that the two are so close according to the utilized figure of merit that the replacement is automatically performed without prompting the user to make the decision. In this case, the user interface may simply report to the user that the replacement was made.

In a use case example, a user uses the business document editor module 1175 to tag a business document with XBRL concepts included in an XBRL taxonomy module 1120. The XBRL concepts may be in a standard XBRL taxonomy, such as a particular reporting year's version of the US GAAP taxonomy. The user may not be aware of an XBRL concept included in the XBRL taxonomy being used that is suitable for accurately describing the user's accounting in the business document, and instead creates an extension taxonomy concept with which a value in the business document is tagged. However, unbeknownst to the user, the extension taxonomy concept created is duplicative of a taxonomy concept already included in the base taxonomy used by the XBRL document representing the business document, and upon which the extension taxonomy is based. This duplicative extension taxonomy concept, and countless others that may have been created for use in the XBRL document, cause a problem for the recipients of the XBRL document, such as the Securities and Exchange Commission (SEC), which will later analyze the XBRL document. These problems include difficulties in making accurate comparisons with corresponding XBRL documents from prior quarters, years, or other reporting periods, or comparisons with corresponding XBRL documents from other organizations. In addition, these problems include difficulties in compiling data from numerous corresponding XBRL documents from other reporting periods or organizations into summary data charts or tables for reporting or statistical analysis.

Rather than performing an arduous manual analysis and editing of the XBRL document to identify and correct the duplicative extension taxonomy concepts used in the XBRL document, an automated analysis and editing may be performed as described herein. The goal of the automated analysis is to detect duplicative or unnecessary extension taxonomy concepts used in the XBRL document, notify the user of these detected concepts, and provide a user interface with which the user can easily correct these duplicative or unnecessary extension taxonomy concepts. Accordingly, creation and editing of a high quality and standardized XBRL document is facilitated for accurate and efficient analysis by an organization to whom the XBRL document is reported. Through the automated analysis, extension taxonomy concepts with which the XBRL document is tagged that are suspected to be duplicative of official base taxonomy concepts may be identified to the user in a user interface. The user may then make an informed decision as to whether to replace the suspect extension taxonomy concept with the identified corresponding base taxonomy concept according to the information provided to the user in the user interface about the suspected extension taxonomy concept and the identified corresponding base taxonomy concept.

Appendix A presents a relevant portion of the 2011 Official US GAAP Release Notes that describe exemplary relationships between the deprecated 2009 Official US GAAP XBRL taxonomy and the 2011 Official US GAAP XBRL taxonomy. Appendix A illustrates exemplary relationships between deprecated concepts and replacement concepts in a new version of an XBRL taxonomy. Appendix B presents relevant portions of Extensible Business Reporting Language (XBRL) 2.1 that discuss the defined XBRL period element (Extensible Business Reporting Language (XBRL) 2.1, §4.7.2, pp. 53-54, available at http://www.xbrl.org/Specification/XBRL-REC-OMMENDATION-2003-12-31+Corrected-Errata-2005-04-25.rtf). Appendix C presents relevant portions of Extensible Business Reporting Language (XBRL) 2.1 that discuss the defined XBRL item period type attribute (Extensible Business Reporting Language (XBRL) 2.1, §5.1.1.1, pp. 76-77, available at http://www.xbrl.org/Specification/XBRL-REC-OMMENDATION-2003-12-31+Corrected-Errata-2005-04-25.rtf). Appendix D presents relevant portions of Extensible Business Reporting Language (XBRL) 2.1 that discuss the defined XBRL item balance attribute (Extensible Business Reporting Language (XBRL) 2.1, §5.1.1.2, pp. 77-79, available at http://www.xbrl.org/Specification/XBRL-RECOM-MENDATION-2003-12-31+Corrected-Errata–2005-04-25.rtf). Appendix E presents relevant portions of Extensible Business Reporting Language (XBRL) 2.1 that discuss the defined XBRL item data types (Extensible Business Reporting Language (XBRL) 2.1, §5.1.1.3, pp. 78-82, available at http://www.xbrl.org/Specification/XBRL-RECOMMEN-DATION-2003-12-31+Corrected-Errata–2005-04-25.rtf).

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. For example, the principles discussed herein may also applicable to other markup-language-based documents besides XBRL as known to one of ordinary skill in the art. In the description of the embodiments, certain detailed explanations of related art are omitted when it is deemed that they may unnecessarily obscure the essence of the invention.

The system described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

APPENDIX A
2011 Official US GAAP Release Notes

| Deprecated Relationship | Description |
| --- | --- |
| No Relationship (Appendix 3, Part A) | No replacement elements exist. Such deprecated items (299 from the 2009 Taxonomy) are included in a Deprecated Concepts Group in the Presentation Linkbase (only) with no on-going relationship to supported elements. |
| essence-alias | The essence-alias relationship is a one to one relationship in which a deprecated element has been replaced by an identical concept. Any elements that fell under this relationship also fall under the dep-concept-deprecatedConcept relationship. All deprecated elements with an essence-alias relationship are included in the count of the dep-concept-deprecatedConcept relationship. |
| dep-aggregateConcept-deprecatedPartConcept (Appendix 3, Part B) | The dep-aggregateConcept-deprecatedPartConcept relationship in the Definition Hierarchy (linkbase) represents multiple concepts that have been deprecated |

APPENDIX A
2011 Official US GAAP Release Notes

| Deprecated Relationship | Description |
| --- | --- |
| | in favor of a single, higher level, more encompassing concept. Sixty nine (69) elements have been deprecated from the 2009 Taxonomy and assigned this relationship. For instance, if three previously distinct groups of elements such as class of common stock, preferred stock, and convertible preferred stock were combined into a single Dimensional Table, the element that combines and replaces the three elements would be an aggregate concept replacing the three part concepts. |
| dep-concept-deprecatedConcept (Appendix 3, part C) | The dep-concept-deprecatedConcept relationship in the Definition Hierarchy (linkbase) represents a one to one relationship. Two hundred and three (203) elements have been deprecated from the 2009 Taxonomy and assigned this relationship. For instance, if an "Instant" period type element replaces a "Duration" period type element, then this relationship would be categorized by the dep-concept-deprecatedConcept relationship. |
| dep-dimensionallyQualifiedConcept-deprecatedConcept (Appendix 3, Part D) | In the case where an element was replaced with a dimensional equivalent, (e.g., Common Stock, Additional Series, No Par Value) the deprecated and replacement element is described using the dep-dimensionallyQualifiedConcept-deprecatedConcept relationship. The fact that was previously meant to be represented by the deprecated element has been replaced by the interaction between the "new" Line Item and the dimensionally qualifying Table Member. One hundred and thirty (130) elements have been deprecated from the 2009 Taxonomy and assigned this relationship. |
| dep-mutuallyExclusiveConcept-deprecatedConcept (Appendix 3, part E) | The dep-mutuallyExclusiveConcept-deprecatedConcept relationship is used when the deprecated element can be two concepts. Two (2) elements have been represented as deprecated from the 2009 Taxonomy and described using this relationship. For instance, the 2009 Taxonomy included elements that were meant to represent either the current portion of a concept in a classified balance sheet or the aggregate of the current and noncurrent portion in an unclassified presentation. Such concepts are mutually exclusive for financial data tagging purposes and, therefore, such elements have been deprecated and replaced with separate mutually exclusive concepts. Preparers that previously used such deprecated concepts should only use one of the mutually exclusive replacement concepts; the value previously tagged with the deprecated concept should not be apportioned between the new concepts. |
| dep-partConcept-deprecatedAggregateConcept (Appendix 3, Part F) | The dep-partConcept-deprecatedAggregateConcept relationship was assigned to deprecated items that were replaced by elements representing greater detail. For instance, if "borrowings concepts" was deprecated and replaced with specific concepts representing distinct types of borrowings and the concepts thereof, the dep-partConcept-deprecatedAggregateConcept relationship was assigned. Thirty seven (37) elements have been deprecated from the 2009 Taxonomy and assigned this relationship. |
| Undeprecated (Appendix 3, Part G) | There were seven (7) elements that were undeprecated from the 2009 Taxonomy for various reasons. The definition relationships defining these elements as deprecated were removed and these elements were placed into the presentation and calculation roles within the taxonomy as appropriate. |

APPENDIX B

The Period Element

The period element contains the instant or interval of time for reference by an item element. The sub-elements of period are used to construct one of the allowed choices for representing date intervals.

| Elements | Meaning |
| --- | --- |
| startDate, endDate | A period beginning and ending as specified. |
| instant | A point in time. |
| forever | An element to represent 'forever'. |

Each of the period sub-elements uses a standard XML Schema representation of a date.

| Sub-element | XML Schema data type |
| --- | --- |
| instant | date or dateTime. |
| forever | empty |
| startDate | date or dateTime |
| endDate | date or dateTime |

While the content of the instant, startDate and endDate elements are defined to use the data representation defined by ISO 8601 (as restricted by XML Schema Part 2: Datatypes, available at http://www.w3.org/TR/xmlschema-2/), XBRL adds further restrictions and constraints.

For an item element with periodType="instant" (See Section 5.1.1.1, "The periodType Attribute," Appendix C herein), the period MUST contain an instant element.

For an item element with periodType="duration", the period MUST contain forever or a valid sequence of startDate and endDate.

A date, with no time part, in the content of an startDate element is defined to be equivalent to specifying a dateTime of the same date, and T00:00:00 (midnight at the start of the day).

A date, with no time part, in the endDate or instant element is defined to be equivalent to specifying a dateTime of the same date plus P1D and with a time part of T00:00:00. This represents midnight at the end of the day. The reason for defining it thus, i.e. as midnight at the start of the next day, is that XML Schema Part 2: Datatypes (available at http://www.w3.org/TR/xmlschema-2/) mandates this representation by prohibiting the value of 24 in the "hours" part of a time specification, which is ISO 8601 syntax.

If supplied, the endDate MUST specify or imply a point in time that is later than the specified or implied point in time of the corresponding startDate.

APPENDIX C

The Periodtype Attribute

Some elements are associated with concepts that are measurable at an instant in time while others measure change over a period of time. The periodType attribute MAY be used on the element syntax definitions.

The periodType attribute MUST be used on elements in the substitution group for the item element. A value of instant for the periodType attribute indicates that the element, when used in an XBRL instance, MUST always be associated with a context in which the period is an instant. A value of duration indicates that the element, when used in an XBRL instance, MUST always be associated with a context in which the period is a duration, expressed using the startDate and endDate elements or expressed using the forever element.

APPENDIX D

The Balance Attribute

An optional balance attribute MAY be added to the definition of an element if its type is monetaryItemType or derived from monetaryItemType. The balance attribute MUST NOT be used on items that do not have type equal to the monetaryItemType or to a type that is derived from monetaryItemType.

If the idea of debit/credit balance is appropriate to the element, it MAY be indicated using this attribute.

The balance attribute is important to applications that consume numbers related to accounting concepts such as asset, liability, equity, revenue and expense. The balance attribute (debit/credit) provides a definitive declaration of how values in XBRL instances are to be authored and interpreted when the debit/credit designation is provided.

| Correct signage in an XBRL instance | | |
|---|---|---|
| Taxonomy element | Account balance | Sign of XBRL instance element value |
| balance = "credit" | Credit | Positive or zero |
| balance = "credit" | Debit | Negative or zero |
| balance = "debit" | Debit | Positive or zero |
| balance = "debit" | Credit | Negative or zero |

The numeric representation of a debit or credit item will normally (that is, more often than not) be positive in an XBRL instance. In addition, the assignment of balance attributes constrains the legal weights in calculationArc elements.

| Constraints among the balance attribute and calculation arc weights | | |
|---|---|---|
| balance attribute of "from" item | balance attribute of "to" item | illegal values of the weight attribute on calculationArc |
| debit | debit | Negative (<0) |
| debit | credit | Positive (>0) |
| credit | debit | Positive (>0) |
| credit | credit | Negative (<0) |

APPENDIX E

Item Data Types

All item types MUST be one of the types listed below or derived from one of them by restriction. This set of XBRL provided base types covers the appropriate subset of XML Schema built-in types (both primitive and derived) as well as 4 types that have been identified as having particular relevance to the domain space addressed by XBRL (monetaryItemType, sharesItemType, pureItemType and fractionItemType) and hence explicitly defined in the XBRL namespace. All these types have simple content except for fractionItemType. Therefore, an item type in a taxonomy can never have complex content unless it is derived by restriction from fractionItemType.

| Defined item types | | |
|---|---|---|
| XBRL Item Type | Base type | unitRef attribute |
| decimalItemType | decimal | yes |
| floatItemType | float | yes |
| doubleItemType | double | yes |
| The following numeric types are all based on the XML Schema built-in types that are derived by restriction from decimal. | | |
| integerItemType | integer | yes |
| nonPositiveIntegerItemType | nonPositiveInteger | yes |
| negative IntegerItemType | negative Integer | yes |
| longItemType | long | yes |
| intItemType | int | yes |
| shortItemType | short | yes |
| byteItemType | byte | yes |
| nonNegativeIntegerItemType | nonNegativeInteger | yes |
| unsignedLongItemType | unsignedLong | yes |
| unsignedIntItemType | unsignedInt | yes |
| unsignedShortItemType | unsignedShort | yes |
| unsignedByteItemType | unsignedByte | yes |
| positiveIntegerItemType | positiveInteger | yes |
| The following numeric types are all types that have been identified as having particular relevance to the domain space addressed by XBRL and are hence included in addition to the built-in types from XML Schema. | | |
| monetaryItemType | xbrli:monetary | yes |
| sharesItemType | xbrli:shares | yes |
| pureItemType | xbrli:pure | yes |
| fractionItemType | complex type with the numerator being a decimal and the denominator being a non-zero, decimal (xbrli:nonZeroDecimal) | yes |
| The following non-numeric types are all based on XML Schema built-in types that are not derived from either decimal or string. | | |
| stringItemType | string | no |
| booleanItemType | Boolean | no |
| hexBinaryItemType | hexBinary | no |
| base64BinaryItemType | base64Binary | no |
| anyURIItemType | anyURI | no |
| QNameItemType | QName | no |
| durationItemType | duration | no |
| dateTimeItemType | dateTime | no |
| timeItemType | time | no |
| dateItemType | date | no |
| gYearMonthItemType | gYearMonth | no |
| gYearItemType | gYear | no |
| gMonthDayItemType | gMonthDay | no |
| gDayItemType | gDay | no |
| gMonthItemType | gMonth | no |
| The following non-numeric types are all based on the XML Schema built-in types that are derived by restriction (and/or list) from string. | | |
| normalizedStringItemType | normalizedString | no |
| tokenItemType | token | no |
| languageItemType | language | no |
| NameItemType | Name | no |
| NCNameItemType | NCName | no |

Some of these types, especially some of those that XML Schema has defined for backward compatibility with Document Type Definitions ("DTDs"), may never be needed for any XBRL application, but all are provided by XBRL for completeness and compatibility with XML Schema.

The Monetary, Shares and Pure Data Types

The XBRL instance schema defines the monetary data type, which specialises the XML Schema decimal type. All numeric elements in XBRL Taxonomies that represent monetary values MUST use the monetaryItemType data type or one derived from it. The shares data type represents share-based values and the pure data type represents growth rates, percentages, and other measures where an implicit numerator and denominator are expressed in the same units. See Section Error! Reference source not found. for definitions of the item types that use these special data types.

The fractionItemType Data Type

The values of some facts that are to be reported may be known exactly but it may not be possible to represent them exactly using any of the built-in data types provided for in XML Schema. Examples are fractional values whose decimal representation contains recurring digits such as ⅓ (whose decimal representation is 0.333333 . . . ). To enable XBRL instances to report these exact values, a complex type, fractionItemType, is provided. All values of fractionItemType are exact. The precision and decimals attributes MUST not occur on items with the fractionItemType.

The numerator element MUST contain numeric values. The denominator element MUST contain a numeric value that is non-zero and finite.

The invention claimed is:

1. An XBRL extension taxonomy concept replacement system comprising:
   a computer processor having a memory on which a program executable by the processor is stored for performing a method of XBRL extension taxonomy concept replacement;
   an XBRL taxonomy module including an XBRL extension taxonomy having XBRL extension taxonomy concepts and an XBRL base taxonomy having related XBRL base taxonomy concepts;
   an automated superfluous XBRL extension taxonomy concept detection module that analyzes an XBRL document having XBRL tags and identifies an XBRL extension taxonomy concept of the XBRL extension taxonomy that is superfluous compared to an XBRL base taxonomy concept of the XBRL base taxonomy; and
   a concept replacement module that replaces the identified XBRL extension taxonomy concept in the XBRL document with the compared XBRL base taxonomy concept,
   wherein the identified XBRL extension taxonomy concept has an edit distance of at least one and less than a threshold compared with corresponding information of the compared XBRL base taxonomy concept.

2. The XBRL extension taxonomy concept replacement system of claim 1, further comprising a user interface module that presents information of the identified XBRL extension taxonomy concept and corresponding information of the compared XBRL base taxonomy concept to a user and receives an instruction to perform the replacement of the identified XBRL extension taxonomy concept with the compared XBRL base taxonomy concept in the XBRL document in response to the presenting of the information.

3. The XBRL extension taxonomy concept replacement system of claim 2, wherein the information includes a text string representing a name of the identified XBRL extension taxonomy concept and a text string representing a name of the compared XBRL base taxonomy concept.

4. The XBRL extension taxonomy concept replacement system of claim 2, wherein the user interface module presents a figure of merit indicating a degree of similarity between the identified XBRL extension taxonomy concept and the compared XBRL base taxonomy concept.

5. The XBRL extension taxonomy concept replacement system of claim 4, wherein the figure of merit includes an edit distance between a text string in the identified XBRL extension taxonomy concept and a corresponding text string in the compared XBRL base taxonomy concept.

6. The XBRL extension taxonomy concept replacement system of claim 4, wherein the figure of merit includes an edit distance between a name of the identified XBRL extension taxonomy concept and a corresponding name of the compared XBRL base taxonomy concept.

7. The XBRL extension taxonomy concept replacement system of claim 4, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is a synonym of a corresponding word included in the corresponding name of the compared XBRL base taxonomy concept.

8. The XBRL extension taxonomy concept replacement system of claim 1, further comprising an XBRL concept search module that searches for XBRL concepts matching search conditions within at least one of the XBRL document, the XBRL extension taxonomy, and the XBRL base taxonomy.

9. The XBRL extension taxonomy concept replacement system of claim 1, further comprising a business document editor module that facilitates tagging of business document entries with XBRL tags using the XBRL taxonomy module.

10. The XBRL extension taxonomy concept replacement system of claim 1, wherein the edit distance is determined according to at least one difference between character strings selected from the group consisting of additional characters, omitted characters, replaced characters, transposition of characters, changed capitalization of characters, typographical errors, insertion of generic separator words or symbols, conjunctions, disjunctions, and prepositions.

11. A method of performing XBRL extension taxonomy concept replacement comprising:
   analyzing, by a computer processor, an XBRL document having XBRL tags to identify an XBRL extension taxonomy concept of an XBRL extension taxonomy that is superfluous compared to an XBRL base taxonomy concept of an XBRL base taxonomy; and
   replacing, by a computer processor, the identified XBRL extension taxonomy concept in the XBRL document with the compared XBRL base taxonomy concept,
   wherein the identified XBRL extension taxonomy concept has an edit distance of at least one and less than a threshold compared with corresponding information of the compared XBRL base taxonomy concept.

12. The method of claim 11, further comprising presenting information of the identified XBRL extension taxonomy concept and corresponding information of the compared XBRL base taxonomy concept to a user and receiving an instruction to perform the replacement of the identified XBRL extension taxonomy concept with the compared XBRL base taxonomy concept in the XBRL document in response to the presenting of the information.

13. The method of claim 11, wherein the analyzing comprises comparing the identified XBRL extension taxonomy concept with a plurality of XBRL base taxonomy concepts and determining a figure of merit indicating a degree of similarity between the identified XBRL extension taxonomy concept and each of the plurality of XBRL base taxonomy concepts.

14. The method of claim 13, further comprising indexing concepts of the XBRL extension taxonomy against concepts of the XBRL base taxonomy based on the figure of merit determined for each pair of the XBRL extension taxonomy concepts and the plurality of XBRL base taxonomy concepts.

15. The method of claim 13, wherein the figure of merit includes an edit distance between a text string in the identified XBRL extension taxonomy concept and a corresponding text string in the compared XBRL base taxonomy concept.

16. The method of claim 13, wherein the figure of merit includes an edit distance between a name of the identified XBRL extension taxonomy concept and a corresponding name of the compared XBRL base taxonomy concept.

17. The method of claim 13, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is a synonym of a corresponding word included in the corresponding name of the compared XBRL base taxonomy concept.

18. The method of claim 11, wherein the edit distance is determined according to at least one difference between character strings selected from the group consisting of additional characters, omitted characters, replaced characters, transposition of characters, changed capitalization of characters, typographical errors, insertion of generic separator words or symbols, conjunctions, disjunctions, and prepositions.

19. An XBRL extension taxonomy concept replacement system comprising:
a computer processor having a memory on which a program executable by the processor is stored for performing a method of XBRL extension taxonomy concept replacement;
an XBRL taxonomy module including an XBRL extension taxonomy having XBRL extension taxonomy concepts and an XBRL base taxonomy having related XBRL base taxonomy concepts;
an automated superfluous XBRL extension taxonomy concept detection module that analyzes an XBRL document having XBRL tags and identifies an XBRL extension taxonomy concept of the XBRL extension taxonomy that is superfluous compared to an XBRL base taxonomy concept of the XBRL base taxonomy based on a figure of merit; and
a concept replacement module that replaces the identified XBRL extension taxonomy concept in the XBRL document with the compared XBRL base taxonomy concept,
wherein the figure of merit indicates a degree of similarity among at least three degrees of similarity along a continuum from a low degree to a high degree of similarity between the identified XBRL extension taxonomy concept and the compared XBRL base taxonomy concept.

20. The XBRL extension taxonomy concept replacement system of claim 19, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is a synonym of a corresponding word included in the corresponding name of the compared XBRL base taxonomy concept.

21. The XBRL extension taxonomy concept replacement system of claim 19, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is an antonym of a corresponding word included in the corresponding name of the compared XBRL base taxonomy concept and whether a balance type of the identified XBRL extension taxonomy concept is opposite of a balance type of the compared XBRL base taxonomy concept.

22. The XBRL extension taxonomy concept replacement system of claim 19, wherein the figure of merit includes whether a data type of the identified XBRL extension taxonomy concept matches a data type of the compared XBRL base taxonomy concept.

23. The XBRL extension taxonomy concept replacement system of claim 19, wherein the figure of merit includes whether a period type of the identified XBRL extension taxonomy concept matches a period type of the compared XBRL base taxonomy concept.

24. A method of performing XBRL extension taxonomy concept replacement comprising:
analyzing, by a computer processor, an XBRL document having XBRL tags to identify an XBRL extension taxonomy concept of an XBRL extension taxonomy that is superfluous compared to an XBRL base taxonomy concept of an XBRL base taxonomy based on a figure of merit; and
replacing, by a computer processor, the identified XBRL extension taxonomy concept in the XBRL document with the compared XBRL base taxonomy concept,
wherein the figure of merit indicates a degree of similarity among at least three degrees of similarity along a continuum from a low degree to a high degree of similarity between the identified XBRL extension taxonomy concept and the compared XBRL base taxonomy concept.

25. The method of claim 24, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is a synonym of a corresponding word included in the corresponding name of the compared XBRL base taxonomy concept.

26. The method of claim 24, wherein the figure of merit includes a similarity of a name of the identified XBRL extension taxonomy concept and a corresponding name of the compared XBRL base taxonomy concept based at least in part on whether a word included in the name of the identified XBRL extension taxonomy concept is an antonym of a corresponding word included in the corresponding name of the compared XBRL base taxonomy concept and whether a balance type of the identified XBRL extension taxonomy concept is opposite of a balance type of the compared XBRL base taxonomy concept.

27. The method of claim 24, wherein the figure of merit includes whether a data type of the identified XBRL extension taxonomy concept matches a data type of the compared XBRL base taxonomy concept.

28. The method of claim 24, wherein the figure of merit includes whether a period type of the identified XBRL extension taxonomy concept matches a period type of the compared XBRL base taxonomy concept.

* * * * *

UNITED STATES PATENT AND TRADEMARK OFFICE
CERTIFICATE OF CORRECTION

| | | |
|---|---|---|
| PATENT NO. | : 9,146,912 B1 | Page 1 of 1 |
| APPLICATION NO. | : 14/473391 | |
| DATED | : September 29, 2015 | |
| INVENTOR(S) | : Benjamin et al. | |

It is certified that error appears in the above-identified patent and that said Letters Patent is hereby corrected as shown below:

Title Page, Item (72) Inventor is corrected to read:
-- Bradley Benjamin, Bozeman (MT);
  Susan Yount, Ames (IA);
  David Andrew Haila, Clive (IA);
  Jason Basteyns, Surprise (AZ);
  Justin Olson, Des Moines (IA);
  Jade Robbins, Bozeman (MT);
  Jason Jones, Urbandale (IA) --.

Signed and Sealed this
Twelfth Day of July, 2016

Michelle K. Lee
*Director of the United States Patent and Trademark Office*